United States Patent [19]

Anderson et al.

[11] Patent Number: 4,518,043

[45] Date of Patent: May 21, 1985

[54] TOOL APPARATUS WITH CONTROL TO MOVE TOOL WHEN OBJECT APPROACHED

[75] Inventors: Jack F. Anderson, Marion, N. Dak. 58466; Clayton Melrose, Oakes, N. Dak.; Floyd Melrose, Brookings, S. Dak.

[73] Assignee: Jack F. Anderson, Marion, N. Dak.

[21] Appl. No.: 406,318

[22] Filed: Aug. 9, 1982

[51] Int. Cl.³ .................... A01B 65/02; A01B 13/04; A01D 35/00

[52] U.S. Cl. ........................................ 172/6; 91/453; 172/38; 172/78; 172/98; 30/379; 56/10.4

[58] Field of Search ............... 172/5, 6, 38, 98, 99, 172/111, 117, 233, 234, 235, 78, 76; 56/10.4, 10.7, 11.9, 15.2, 15.5, 15.7; 30/379; 91/453, 459

[56] References Cited

U.S. PATENT DOCUMENTS

| | | | |
|---|---|---|---|
| 1,145,240 | 7/1915 | Gouldh | 172/99 X |
| 2,489,633 | 11/1949 | Fulgham | 172/5 |
| 2,601,366 | 6/1952 | Chapman | 56/15.5 X |
| 2,662,561 | 12/1953 | Duncan, Jr. | 30/379 |
| 2,664,802 | 1/1954 | Myer | 172/6 |
| 2,699,635 | 1/1955 | Burton | 56/15.7 |
| 2,718,836 | 9/1955 | Pertics et al. | 172/99 |
| 2,764,077 | 9/1956 | Pertics et al. | 172/99 X |
| 2,791,081 | 5/1957 | Allen et al. | 56/15.7 |
| 2,990,890 | 7/1961 | Butterfield | 172/81 X |
| 2,997,835 | 8/1961 | Stewart | 56/15.7 |
| 3,003,299 | 10/1961 | Smith et al. | 56/15.7 |
| 3,059,704 | 10/1962 | Kasatkin | 172/99 X |
| 3,061,996 | 11/1962 | Ripps | 56/11.9 X |
| 3,117,632 | 1/1964 | Caggiano, Jr. | 172/5 |
| 3,138,208 | 6/1964 | Simms | 172/38 |
| 3,169,583 | 2/1965 | Thurow | 172/111 |
| 3,190,364 | 6/1965 | Maloney | 172/111 |
| 3,200,890 | 8/1965 | Courtway | 172/111 |
| 3,274,762 | 9/1966 | Jolls | 172/5 |
| 3,913,681 | 10/1975 | Lincoln et al. | 172/5 |
| 4,048,789 | 9/1977 | Cartner | 56/11.9 |
| 4,206,580 | 6/1980 | Truax et al. | 56/10.4 |
| 4,332,299 | 6/1982 | Parks et al. | 172/98 |

FOREIGN PATENT DOCUMENTS

2044593 10/1980 United Kingdom .................. 172/5

Primary Examiner—Richard T. Stouffer
Attorney, Agent, or Firm—Young & Martin

[57] ABSTRACT

The disclosure in this patent application includes a retractable in-row tiller device that has a parallelogram carriage structure for supporting the outrigger arm and tiller and for retracting and extending the outrigger arm and tiller in relation to the tractor on which it is mounted. It also includes an electro-hydraulic control system with a single wand plant feeler device that provides very accurate and responsive automatic control to guide the tiller around plants and which can be overridden and operated manually with ease and accurateness. It also includes an automatic positive depth control feature operated electro-hydraulically by a gauge wheel.

23 Claims, 5 Drawing Figures

TOOL APPARATUS WITH CONTROL TO MOVE TOOL WHEN OBJECT APPROACHED

BACKGROUND

The present invention relates generally to tiller apparatus, and more particularly to novel and improved automatic retractable tillers adapted for tilling interstitial unplanted soil between plants or objects in a row and method of guiding same.

Cultivating or tilling the interstitial unplanted soil between plants in a row to control weed growth, mulch, and aerate the soil is desirable to optimum plant growth and good husbandry. There have been a number of prior developments and inventions relating to tillers adapted to till the interstitial soil between plants in a row, including several embodiments of such devices invented by one or more of the joint inventors of this invention. For example, U.S. Pat. No. 4,287,955 issued to Jack F. Anderson discloses such an in-row rotary tiller device adapted for mounting on a skid turn vehicle. Also, the co-pending patent application Ser. No. 240,137, entitled Retractable In-Row Tiller Device, filed Mar. 2, 1981, and co-pending patent application Ser. No. 355,100, entitled Method and Apparatus for Guiding Retractable In-Row Tiller Device, filed Mar. 3, 1982, both of which were invented by Jack F. Anderson and Clayton Melrose, disclose automatic retractable in-row tillers for mounting on a vehicle and tilling between plants in a row.

The following patents disclose some other examples of devices which include some mechanism for moving tiller apparatus laterally in relation to the tractor into and out of the area between plants in a row: U.S. Pat. Nos. 2,489,633 issued to Fulgham; 2,664,802 issued to I. Myer; 2,718,836 issued to E. P. Pertics, et al; 2,764,077 issued to E. P. Pertics, et al; 3,059,704 issued to Kasatkin; 3,117,632 issued to V. G. Caggiano, Jr.; 3,138,208 issued to S. G. Simms; 3,190,364 issued to Maloney; 3,200,890 issued to Courtway; and 3,913,681 issued to W. D. Lincoln, et al. These prior art devices typically include cumbersome mechanical controls for extending and retracting a tiller into and out of the row. The U.S. Pat. Nos. 2,489,633 issued to Fulgham, 3,138,208 issued to Simms, and 3,200,390 issued to Courtway are examples of such devices that utilize various mechanical apparatus for extending and retracting a tiller into and out of a row. The Myer patent, U.S. Pat. No. 2,644,802, utilizes an electric solenoid mechanism for extending and retracting a tiller into and out of row. The U.S. Pat. Nos. 2,718,836 issued to Pertics, et al, 2,764,077 issued to Pertics, et al, 3,059,704 issued to Kasatkin, 3,913,681 issued to Lincoln, et al, all include hydraulic controls. The apparatus of the mechanically and electrically controlled tiller devices are cumbersome, and even the prior art hydraulically controlled tillers usually lack effective, sensitive, response and speed of travel in retracting and extending into the row.

While some of the prior art devices, such as those disclosed in U.S. Pat. Nos. 2,489,633 issued to Fulgham, 2,664,802 issued to Myer, 3,117,632 issued to Caggiano, 3,138,208 issued to Simms, 3,200,890 issued to Courtway, and 3,913,618 issued to Lincoln, et al include sensing apparatus for sensing the plants and causing the tiller apparatus to move around the plants, such devices are lacking in specific desirable features such as accurate response to objects sensed, effective speed of response in retracting and extending a tiller out of and into the row, adaptability to varying soil conditions and terrain, and sufficient convenient manual control options to allow the operator flexibility in dealing with various sized weeds and other objects that might be encountered in the row in addition to the plants to be cultivated.

In addition to the prior art mentioned above, the U.S. Pat. No. 1,145,240, issued to Gould and U.S. Pat. No. 2,990,890, issued to Butterfield disclose retractable rotary tillers equipped with mechanical retraction devices. U.S. Pat. No. 1,664,789, issued to von Meyenburg U.S. Pat. No. 2,651,246, issued to Perters, et al, U.S. Pat. No. 3,169,583, issued to Thurow, U.S. Pat. No. 3,419,086, issued to Giusti, et al, and U.S. Pat. No. 4,044,839, issued to van der Lely, all disclose various structures for non-retractable rotary tillers. In addition to the tiller patents mentioned above, there are a number of mower and saw devices which have been adapted for mounting on vehicles and include some form of retraction and extension apparatus for moving the mowers or saws towards and away from the vehicle. Such retractable mower or saw devices are shown in U.S. Pat. No. 2,719,081, issued to Allen, et al, U.S. Pat. No. 2,662,561, issued to Duncan, U.S. Pat. No. 2,699,635, issued to Burton, U.S. Pat. No. 2,601,366, issued to Chapman, U.S. Pat. No. 3,003,299, issued to Smith, et al, U.S. Pat. No. 3,061,996, issued to Ripps, U.S. Pat. No. 3,274,762, issued to Jolls, U.S. Pat. No. 4,048,789, issued to Cartner, U.S. Pat. No. 2,997,835, issued to Stewart, U.S. Pat. No. 2,840,974, issued to Dunn, et al, and U.S. Pat. No. 4,206,580, issued to Truax, et al. The mower of saw patents issued to Allen, Duncan, Burton, Chapman, and Smith are equipped with mechical retraction devices, and the movers shown in the patents issued to Ripps, Jolls, Cartner, Stewart, Dunn, and Truax are equipped with hydraulic retraction mechanisms.

In spite of the advancements in the art made by those prior art inventions mentioned above, including those invented by one or more of the co-inventors of this invention, it has been found that additional improvements in structural and control features are desirable for improving reliability, sensitivity, and responsiveness for a wider variety of applications in diverse soil conditions and applications. For example, light and sandy soils, hard and heavy soils, and bermed or sharply contoured areas present unique control problems not adequately met by prior art devices. Also, it has been found to be desirable to include control features and inherent functional weaknesses in the automatically controlled equipment. Further, it has been found that substantial improvements can still be made in operator control convenience.

SUMMARY OF THE INVENTION

Accordingly, it is an object of the present invention to provide novel, improved, and practical retractable rotary tiller apparatus capable of producing stable and consistent tilling results in all kinds of soil conditions from extremely light and sandy soild to heavy clay and loams.

It is also an object of the present invention to provide novel and improved method and apparatus for sensing objects and moving a tiller apparatus swiftly and accurately around the objects.

A further object of the present invention is to provide retractable in-row tiller apparatus with controls including a sensor adapted to accurately sense an object in the proximity of the tiller before the tiller contacts the object and to cause the tiller to be automatically retracted from the row to avoid the object as well as to be automatically extended into the row after the tiller has passed the object and is sufficiently responsive in a speedy manner to till closely to the plant while allowing acceptable forward speed.

A still further object of the present invention is to provide retractable in-row tiller apparatus wherein the retraction and extension out of and into the row of objects is easily operable with manual controls as well as by automatic sensing controls.

Still another object of the present invention is to provide improved retractable in-row tiller apparatus having controls where an operator can manually override automatic retraction sensing and control features.

The retractable tool or tiller apparatus of this invention includes a rigid outrigger arm with a tool, such as a rotary tiller, mounted on the distal end thereof, a pivotal control arm for extending and retracting the outrigger arm in relation to the vehicle on which it is mounted and a leveler arm connected to the outrigger arm in a generally parallelogram relation for controlling and maintaining the attitude of the outrigger arm in relation to the ground. It also includes electro-hydraulic control apparatus and circuits for controlling a tool or tiller drive motor, lifting and lowering the outrigger arm and tool in relation to the ground and modulating tiller penetration in the ground, and for extending and retracting the outrigger arm and tool in relation to the vehicle. The extension and retraction function is generated by a double acting hydraulic cylinder, which is controlled by a three position, four-way solenoid valve to extend, retract, or hold the cylinder.

The solenoid valve is controlled by an electric circuit either automatically by sensor apparatus adapted to detect an object, such as a plant, in proximity to the tool, or manually by electric switches. The sensor apparatus includes a single wand that is adapted to actuate a set of switches in sequence such that the tool is extended after it clears the object, but can remain stationary in a partially retracted position when the wand is touching the object and the tool is neither approaching closer nor moving farther away from the object.

Manually operated switches can be used to override the sensor operated switches or to operate the extension and retraction functions manually instead of the automatic operating system. The manual switches are preferably, but not necessarily, operated by a single multiple function joy stick connected to all the switches.

The hydraulic system includes a priority flow distribution feature to insure that the extension and retraction cylinder operates positively and independently of the other functions and a bypass system to bypass fluid around the extension and retraction cylinder when it is not operating. The lift cylinder can be modulated in relation to motor pressure, or a slight net downward pressure can be applied by actuating a valve to connect return system back pressure to both ports of the lift cylinder. Other control features include outer extension limit apparatus, a valve to keep the lift cylinder inactive when the tool is not fully extended, and alternative depth control apparatus for operating the lift cylinder up or down by a solenoid valve connected to a gauge wheel operated two pole, normally open switch.

BRIEF DESCRIPTION OF THE DRAWINGS

Other objects, advantages, and capabilities of the present invention will become apparent as the description proceeds taken in conjunction with the accompanying drawings, in which.

DETAILED DESCRIPTION OF THE PREFERRED EMBODIMENTS

Figure 1:
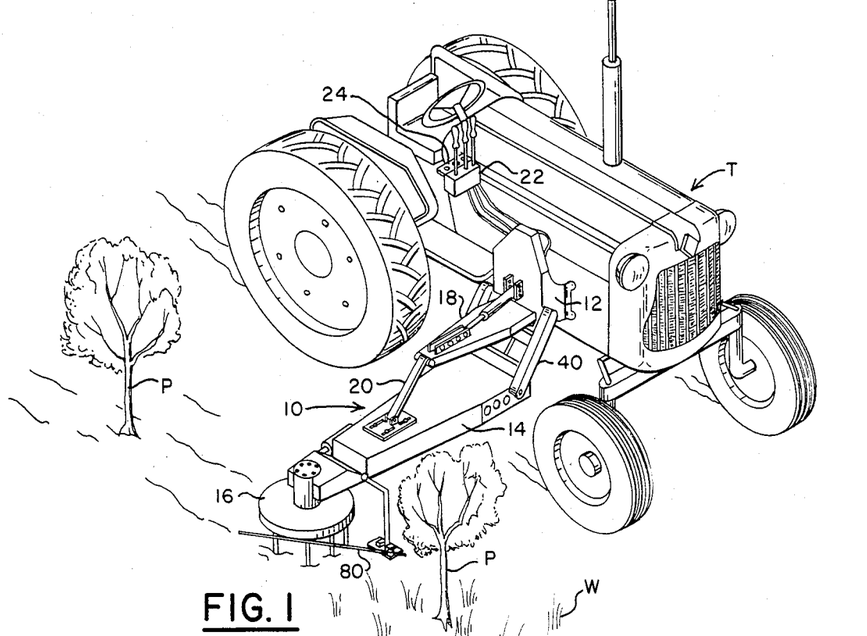
FIG. 1 is a perspective view of the retractable in-row tiller apparatus of the present invention mounted on the side of a tractor and shown tilling the soil between plants in a row.

A retractable tiller device 10 is shown in FIG. 1 mounted on the side of a tractor T. Essentially, the retractable tiller apparatus 10 is comprised of an outrigger arm 14 which extends laterally outward from the side of a tractor T, a rotary tiller head 16 mounted at the distal end of the outrigger arm 14, a mounting frame 12 attached to the tractor T, and a trapeze-type extension and retraction assembly 40 pivotally mounted on the mounting frame 12 and pivotally attached to the outrigger arm 14 for retracting the outrigger arm 14 and tiller head 16 toward and away from the tractor T, as will be described more fully below. The depth control and tiller lifting structure of the present invention includes a leveler arm 18 and pivotal suspension strut 20 connected to the main frame 12 and outrigger arm 14 in a more or less parallelogram structural relationship.

As shown in FIG. 1, the outrigger arm 14 extends outwardly from the side of the tractor T in a substantially horizontal position above the ground when the tiller head 16 is in position to till the ground. As the tractor T travels substantially parallel to a row of plants P, the rotary tiller head 16 can till the interstitial soil between the plants P. As the tiller head 16 approaches a plant P, the extension and retraction assembly 40 pulls the outrigger arm 14 and tiller head 16 inwardly toward the tractor T a sufficient distance to allow the tiller head 16 to pass around plants P as shown in FIG. 1. When the tiller head 16 has safely passed around the plant P, the extension and retraction assembly 40 extends the outrigger arm 14 and tiller head 16 outwardly away from the tractor T to till the soil between the plants P.

The retractable tiller apparatus 10 of the present invention includes a novel electro-hydraulic control system for controlling the various movements and operations of the tiller apparatus 10. The extension and retraction of the outrigger arm 14 and tiller head 16 can be controlled manually by easily operated electrical switches mounted on a convenient accessible panel 24. These functions can also be controlled automatically by novel sensor apparatus, including a single sensor wand 80, which is adapted to feel the presence of a plane P in proximity to the rotary head 16. Upon detecting the presence of a plant P, the solenoid valve 130 is actuated to cause the outrigger arm 14 and rotary tiller head 16 to be retracted from the row to proceed around the plant P without damaging the plant.

The electro-hydraulic operating system also allows an operator to manually override the automatic extension and retraction feature to prevent the retraction of the rotary tiller 16 from the row if desired. This feature is particularly beneficial where the sensors 80 of the rotary tiller might encounter a large weed or other object that would under normal circumstances cause the tiller head 16 to be retracted out of the row to move around such an object. With the manual override feature provided in this invention, the operator can prevent the retraction of the rotary tiller head 16, thereby causing the tiller to cultivate over such large weeds and destroy them. This feature has been found to be quite useful in initial tilling operations where large weeds have grown to a size comparable to or larger than the plants in the row being tilled.

The hydraulic controls in valve bank 22 allow the operator to easily and conveniently operate the hydraulic motor 30 in a forward or reverse direction, modulate the depth of the tiller with an upwardly directed pressure in proportion to the power required by the hydraulic motor 30, or with a slight downward pressure as desired, and to tilt the rotor head 16 upwardly or downardly in relation to the outrigger arm 14. The outrigger arm 14 can also be raised or lowered as desired by the operator.

In this invention, the hydraulic circuit for controlling the extension and retraction cylinder 56 has a common hydraulic fluid source with, but is otherwise independent of, the operation of the hydraulic motor and of the lift and depth control cylinder 70 so that the tiller is retracted and extended in a positive, constant movement and speed regardless of power required to turn the motor or the hydraulic pressure required by the depth control features. Further, the dept control circuit of this invention can be locked to a positive position in relation to the tractor T and maintained in that position, regardless of the power required by the hydraulic motor to turn the tiller or of the extension or retraction of the outrigger arm 14. Also, the outrigger arm 14 and tiller head 16 can be extended and retracted freely without having to simultaneously collapse or retract the lift and depth control cylinder 70. This feature is particularly beneficial in light, sandy soil for support for the tiller head 16 by the soil is minimal or extremely variable, thereby conducive to gouging by the tiller head.

The mounting frame 12 is adapted for mounting the tiller device 10 on a tractor T or other vehicle. A mounting plate 26 is provided on its inside end for this purpose. The extension and retraction assembly 40 is comprised of a trapeze carriage frame 42 pivotally mounted on the outer lower corner of the mounting frame 12 with an upper mounting shaft 52. The trapeze carriage 42 extends generally downwardly from the upper mounting shaft 52, and it lower end is pivotally mounted to the inward end of the outrigger arm 14 with a lower mounting shaft 54.

The trapeze carriage frame 42 is generally comprised of a pair of spaced apart generally vertical frame sections 44, 46 rigidly connected together in parallel spaced-apart relation to each other by a pair of cross frame pieces 48, 50. The ends of the upper mounting shaft 52, which is attached to the outer, lower corner of the main frame 12, extends through the upper ends, of the respective frame sections 44, 46. The lower mounting shaft 54 extends through respective lower ends of the frame sections 44, 46 and through a selected set of holes 55 located in the outrigger arm 14 adjacent the inner end thereof.

Figures 2, 5:
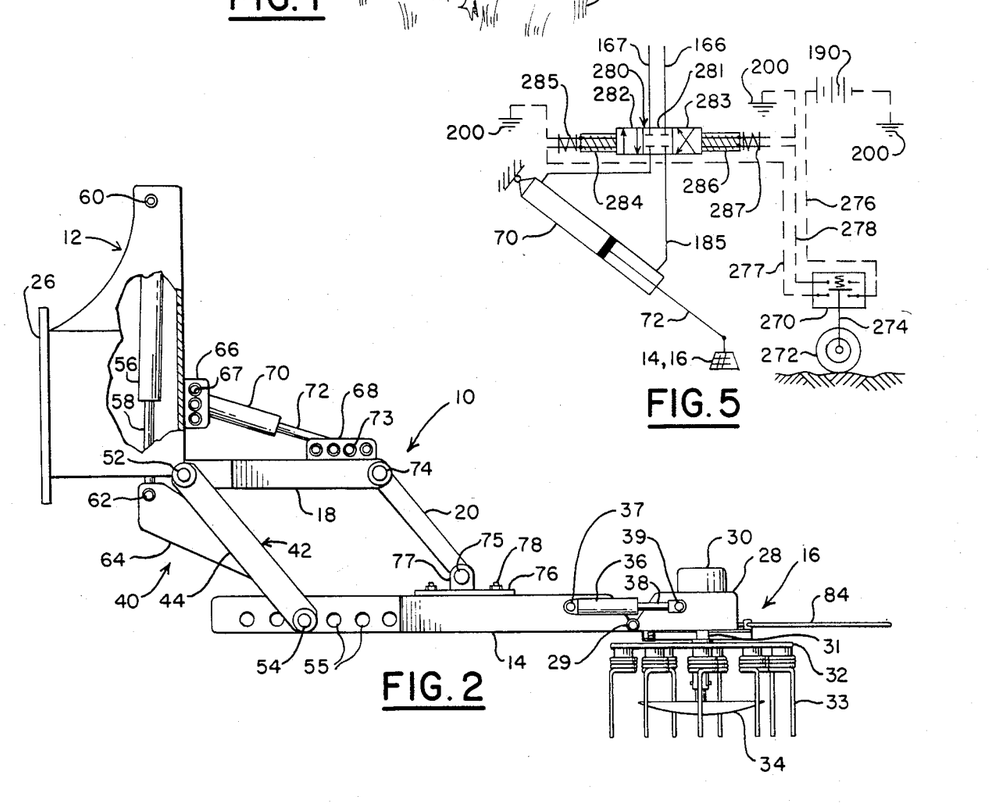
FIG. 2 is a side elevation view of the retractable in-row tiller apparatus of the present invention.
FIG. 5 shows a schematic diagram of an alternate embodiment of the depth control feature of the present invention.

The extension and retraction assembly 40 also includes a lever arm 64 rigidly attached to the trapeze carriage frame 42 as best seen in FIG. 2. The lever arm 64 extends inwardly and upwardly from the trapeze carriage frame 42 to a position generally a spaced distance inwardly from upper mounting shaft 52. The hydraulic cylinder 56 is mounted in the main frame 12 for moving and controlling the trapeze carriage frame 42. The blind end of cylinder 56 is pivotally mounted on a pin 60 attached to the upper end of the main frame 12, and the rod end 58 is pivotally attached to the upper end of lever arm 64 by pin 62. Therefore, downward extension of piston rod 58 causes the lower end of trapeze carriage frame 42 to swing outwardly in relation to the tractor T, and retraction of piston rod into the cylinder 56 causes the lower end of trapeze carriage frame 42 to swing inwardly toward the tractor T. Of course, since the lower end of trapeze carriage frame 42 is attached to the inward end of outrigger arm 14, extension and retraction of the piston rod 58 also causes the outrigger arm 14 and tiller head 16 to be retracted and extended correspondingly inwardly and outwardly in relation to the tractor T.

The up and down relationship of the outrigger arm 14 to the ground is maintained and controlled by a leveler arm 18 which is also pivotally mounted on upper mounting shaft 52. Leveler arm 18 extends generally outward from shaft 52 in generally parallel, spaced-apart relation to the outrigger arm 14. This generally parallel relationship of leveler arm 18 and outrigger arm 14 is maintained by an elongated suspension link 20. The upper end of suspension link 20 is pivotally mounted by shaft 74 to the outer end of leveler arm 18, and the lower end is pivotally mounted by shaft 75 to the outrigger arm 14.

An adjustable mounting plate 76 with a plurality of slotted holes 79 is positioned on the upper surface of outrigger arm 14 and is fastened thereto by bolts 78. The lower end of suspension link 20 is pivotally connected by pin 75 to a pair of ears 77 extending upwardly from plate 76. The position of the lower end of suspension link 20 can be set at any position in relation to the outrigger arm 14 within the range of the slotted holes 79. This adjustment can be used to vary the extent to which the tiller head 16 moves up or down throughout the extension and retraction of the outrigger arm 14. It is possible to adjust this suspension link 20 mounting to nearly eliminate any arcuate movement of the tiller head 16 throughout the extension and retraction movement. Alternatively, it can be adjusted outwardly to cause the tiller head 16 to move up at the outer extent of the extension or inwardly to move it down at the outer end of the extension.

A hydraulic lift cylinder 70, which is used to lift and lower the tiller head 16 and to control the tilling depth of the implement is mounted at an angle between main frame 12 and the outer end of leveler arm 18. The blind end of the cylinder 70 is mounted by a pin 71 in one of a selected set of holes 67 in mounting bracket 66 on the outside surface of main frame 12, and the rod end 72 is mounted by a pin 73 in one of the sets of holes 69 in mounting bracket 68 on the upper surface of leveler arm 18. The plurality of holes 67 in bracket 66 and holes 69 in bracket 68 allow the operator to select a desired angular relationship between the cylinder 70 and the leveler arm 18, which determines the magnitude of the upward or downward force applied by the lift cylinder 70 to the outrigger arm 14 for purposes of depth control and modulation, as will be more fully described below. In general, a larger angle between the cylinder 70 and leveler arm 18 results in a stronger lifting or lowering force applied to outrigger arm 14, and a smaller angle between cylinder 70 and leveler arm 18 results in a weaker lifting or lowering force applied to outrigger arm 14.

In the structural configuration of this invention, the extension and retraction of outrigger arm 14 by hydraulic cylinder 56 is essentially independent of and not affected by the position or extension of lift cylinder 70. In other words, the outrigger arm 14 can be extended and retracted freely while piston 72 of cylinder 70 remains stationary, or while cylinder 70 provides the modulating upward or downward force on outrigger arm 14 to maintain the desired depth control of the rotary tiller head 16. The parallelogram structure of the trapeze control arm 42, outrigger arm 14, leveler arm 18, and suspension link 20 keep the outrigger arm 14 and tiller head 16 traveling over the ground in approximately parallel relation to the the leveler arm 18 and the ground during retraction and extension out of and into a row fo plants P, while the lift cylinder 70 can remain stationary to hold leveler arm 18 in the desired position.

The tiller head 16 is comprised of an outer frame section 28 with a hydraulic motor 30 mounted therein. The motor shaft 31 extends vertically downwardly from the motor 30, and has mounted thereon a flat circular rotor plate 32. A plurality of teeth 33 extend downwardly from the peripheral surface of the circular rotor plate 32. An optional positive depth plate 34 can also be used for limiting the penetration of the teeth 33 in the ground, if desired.

The outer frame section 28 is pivotally mounted by shaft 29 to the outer end of outrigger arm 14. The attitude or tilt of the rotor head 16 is set and adjusted by a tilt cylinder 36. The tilt cylinder 36 is mounted by shaft 37 at its blind end to the outrigger arm 14, and the rod end 38 is mounted by shaft 39 to the outer frame 28 in such a manner that retraction of rod 38 into cylinder 36 causes the tiller head 16 to pviot about shaft 29 to tilt upwardly and outwardly. Conversely, extension of rod 38 from cylinder 36 causes the tiller head 16 to be pivoted about shaft 29 to tilt downwardly and inwardly. This tilt feature is particularly desirable for operating the tiller in applications, such as orchards or vineyards where the trees or vines are planted in relatively high berms or ridges in relation to the adjacent ground. This feature also provides for moving soil out of and into the row (hilling, etc.) by tilting the tiller head up or down.

Figure 3:
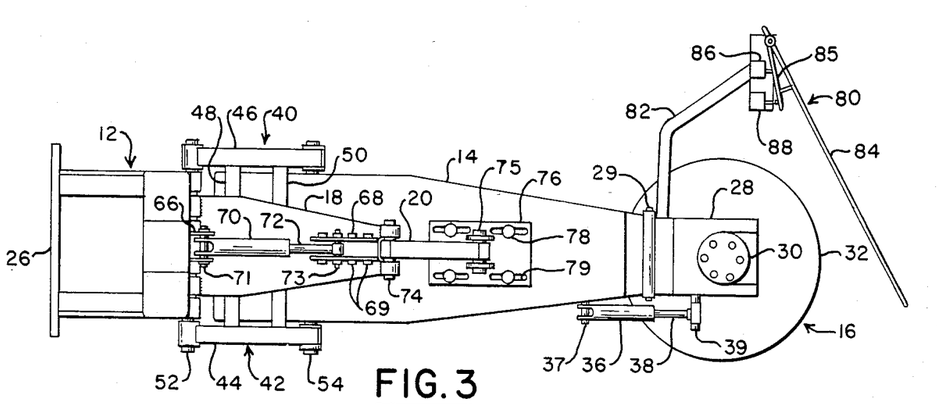
FIG. 3 is a plan view of the retractable in-row tiller apparatus of the present invention.
Figure 4:
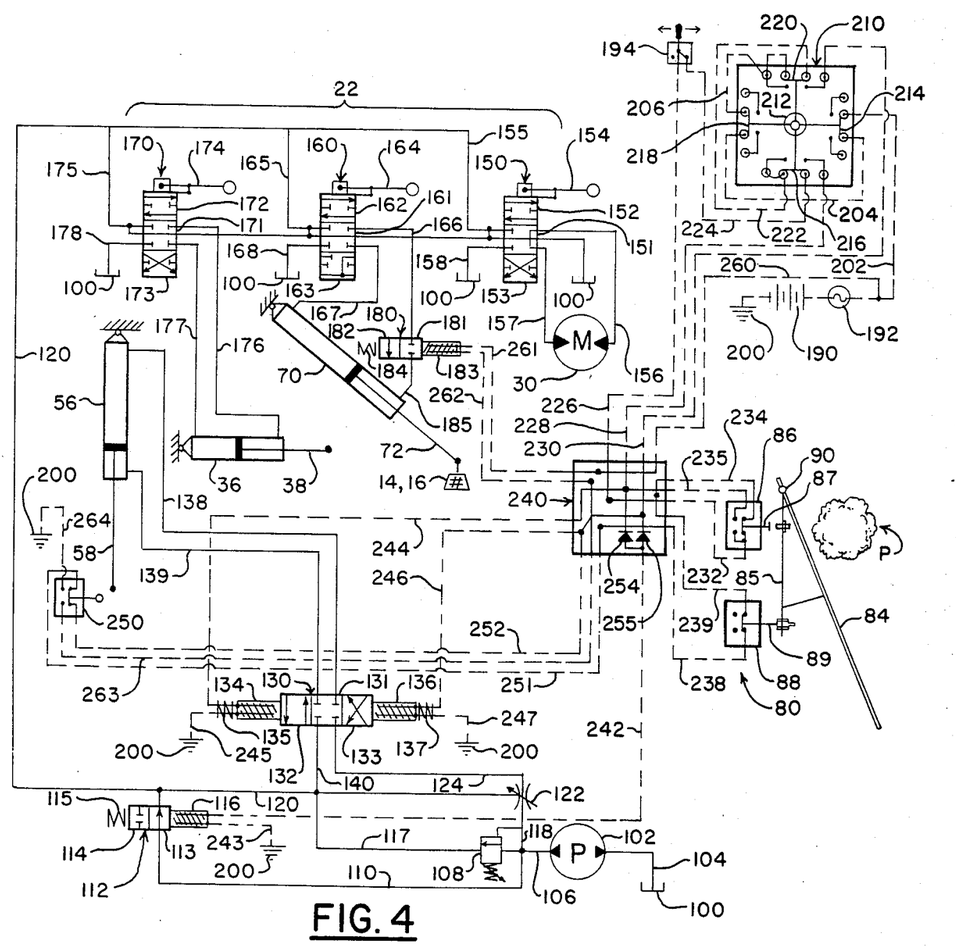
FIG. 4 is a schematic diagram of the preferred electro-hydraulic control system for the retractable in-row tiller device of the present invention.

The electro-hydraulic control circuit of the present invention is shown in FIG. 4, and it is best understood by reference also to the structure illustrated in FIGS. 1 through 3. The valve bank 22 includes three valves 150, 160, and 170. Valve 150 controls the hydraulic motor 30, valve 160 controls the lift cylinder 70, and the valve 170 controls the tilt cylinder 36. The extension and retraction cylinder 56 is controlled by a solenoid valve 130, which is activated automatically by the plant sensor apparatus 80 or manually by the multiple function joy stick switch apparatus 210, as desired by the operator. As mentioned above, the extension and retraction cylinder 56 operates independently of the motor 30, lift cylinder 70, and tilt cylinder 36, so that its extension and retraction motions are positive, smooth, and uninhibited by any of the other components. Likewise, the motor 30, lift cylinder 70, and tilt cylinder 36 are not inhibited by the extension and retraction movements of cylinder 56. An exception to this latter independent feature between the lift cylinder 70 and the extension and retraction cylinder 56 is available as an option when the system is equipped with the solenoid valve 180 in the pressure line 166 for lift cylinder 70. This feature will be described in more detail below; however, suffice it to say at this time that its purpose is to prevent the lift cylinder 70 from moving in any direction unless the rod 58 of cylinder 56 is fully extended.

The hydraulic system shown in FIG. 4 operates on pressurized hydraulic fluid from a pump 102 which draws oil through a suction line 104 from a reservoir or tank 100 and directs it under pressure to the control system of this apparatus through a pressure line 106. The pump 102 can be the standard equipment hydraulic pump in a conventional tractor hydraulic system, or it can be a special hydraulic pump driven by power source, such as the power take off on a tractor or other vehicle on which the apparatus is mounted.

Hydraulic fluid under pressure can be directed from pressure line 106 through a bypass line 110 to the main pressure line 120 leading to the valve bank 22, or it can be directed through pressure line 118 to a priority valve 122. The priority valve 122 divides the flow of hydraulic fluid into pre-selected proportions and directs these proportions of flow into separate lines regardless of whether there might be pressure differentials between the separate lines. Therefore, each of the separate lines will always have available to it the pre-selected proportion of hydraulic fluid, regardless of loads or pressures encountered. This hydraulic circuit design allows this retractable tiller to be operated quite satisfactorily by only standard equipment tractor hydraulic systems without the necessity of using auxiliary pumps, tanks, and the like.

In this apparatus, the adjustable priority valve 122 sends the metered proportions of the fluid flow into line 124 which feeds the extension and retraction cylinder 56, and the remaining flow is directed to the main line 120 leading to the valve bank 22. Therefore, the function of priority valve 122 is to insure that the extension and retraction cylinder 56 always has available to it a constant preset flow of hydraulic fluid on demand and which is not starved by the hydraulic motor 30, lift cylinder 70, or tilt cylinder 36. Also, the lack of applied load on the motor 30 won't cause the cylinder 56 to be slow or inoperative due to low pressure. A second bypass line 117 is connected to pressure line 106 to bypass fluid from pressure line 106 around the priority valve 122 to the main line 120 in the event fluid flow to cylinder 56 is cut off, such as by the solenoid valve 130, by the piston in cylinder 56 reaching the extreme end of its travel in either direction, or by the tiller head abutting against an immovable object. An adjustable pressure relief valve 108 is positioned in bypass line 117 so that hydraulic fluid cannot flow through bypass line 117 to main line 120 until a pre-selected pressure threshhold is reached. This pre-set pressure threshhold is preferably set to be greater than the pressure necessary to operate cylinder 56 under normal conditions, but low enough to prevent damage to the equipment if and immovable object, such as a large tree, gets in the path of extension.

The hydraulic system would operate satisfactory without the bypass line 110, since fluid can bypass the priority valve 122 in cylinder 56 by flowing through pressure relief valve 108 and bypass line 117 as just described above. However, flow through the pressure relieve valve 108 does consume some power and creates some unnecessary heat when cylinder 56 is not operating. Therefore, to economize the power requirement of the system and to minimize heat generation, bypass line 110 is provided to bypass the priority valve 122 and pressure relief valve 108 to main line 120 when fluid is not required to operate cylinder 56.

The bypass flow and bypass line 110 is directed through solenoid valve 112 which is normally open, i.e., normally positioned in the straight flow through mode of position 113. However, as will be described in more detail below, the system is designed such that any time hydraulic fluid is directed to cylinder 56 to extend or retract the outrigger arm 14 of the tiller apparatus 10, the solenoid valve 112 will switch automatically to the blocked mode of position 114 to prohibit fluid flow through bypass line 110. Therefore, during extension and retraction functions of cylinder 56 under normal operating conditions, the flow of pressurized hydraulic flow from pump 102 is directed to the priority valve 122 where it is divided and sent in pre-selected proportions of the total flow through line 124 to cylinder 56, and the remainder of the flow is sent through line 120 to the valve bank 22.

As mentioned briefly above, the solenoid 130 controls the flow of hydraulic fluid to extension and retraction cylinder 56. The solenoid valve 130 is preferably a three position, four-away valve having a blocked port mode in neutral position 131, a straight flow through mode in position 132, and a cross over mode in position 133. When the valve 130 is positioned in the blocked port mode of position 131, no hydraulic fluid can flow to or from cylinder 56, so the outrigger arm 14 is locked immovably in position. In order to retract the outrigger arm 14 to pull the tiller head 16 out of the row of plants P, the solenoid valve 130 is shifted to the cross over mode of position 133. In this cross over position 133, hydraulic fluid under pressure from the priority valve 122 can flow through line 124 to valve 130, where it is crossed over to line 139 and directed into the rod end of cylinder 56. Hydraulic fluid directed into the rod end of cylinder 56 causes the rod 58 to be retracted into the cylinder 56, which causes a corresponding retraction of the outrigger arm 14 toward the tractor T and pulls the tiller head 16 out of the row of plants P.

Conversely, when the tiller head has passed the plant P and it is desired to extend the tiller head 16 back into the row of plants P, the solenoid valve 130 is shifted to the straight flow through mode of position 132. In this mode, the hydraulic fluid from priority valve 122 is directed through line 124 and straight through valve 130 to line 138 into the blind end of cylinder 56. Hydraulic fluid under pressure directed into the blind of cylinder 56 causes the rod 58 to extend, thereby also extending the outrigger arm 14 and tiller head 16 back into the plant row. Return flow from cylinder 56 is directed through line 140 to the main line 120 where it joins the excess flow from the priority valve 122 to flow to the valve bank 22. Therefore, there is always a full flow of hydraulic fluid to the valve bank 22, even though some of the flow is directed at times through cylinder 56 during retraction and extension functions. The automatic and manual controls for operating the solenoid valve 130 to extend or retract cylinder 56 will be described in more detail below.

The flow of hydraulic fluid under pressure through main line 120 can be directed selectively to operate the motor 30, lift cylinder 70, or tilt cylinder 36. The flow of hydraulic fluid to the motor 30 is controlled by a three position, four-way valve 150 equipped with a manual lever accuator 154. The valve 150 has a float mode in the neutral or center position 151, a straight flow through mode in position 152, and a cross over mode in position 153.

When the valve 150 is in the float mode of position 151, no hydraulic fluid under pressure is directed to the motor 30, and the motor 30 is inoperable. When the valve 150 is shifted to the straight flow through mode of position 152, hydraulic fluid under pressure can flow from main line 129 through branch line 155 straight through the valve 150 and through line 156 to operate motor 30. Return flow from the motor 30 flows through line 157 straight through valve 150 and return line 158 to tank 100. When valve 150 is positioned in the cross over mode of position 153, hydraulic fluid under pressure is directed from branch line 155 through line 157 to drive motor 30 in the opposite or reverse direction.

The lift cylinder 70 is controlled by a three position, four-way valve 160 equipped with a manual actuator lever 164. The valve 160 includes a blocked port mode in the center or neutral position 161, a straight flow through mode in position 162, and a float mode in position 163. The solenoid valve 180 positioned in pressure line 166 to the rod end of cylinder 70 is an optional feature which allows cylinder 70 to move only when the extension and retraction cylinder 56 is fully extended. The operation of this solenoid valve 180 and its purpose will be described in more detail below. However, for purposes of this portion of the description, it can be assumed either that the solenoid valve 180 is not there, or that it is positioned in the straight flow through mode of position 182, as if the rod 58 of cylinder 56 is fully extended so that hydraulic fluid can flow freely through solenoid valve 180 to and from lines 166 and 185 into and out of the blind end of cylinder 70. Keeping this assumption in mind, when the valve 160 is positioned in the blocked port mode of position 161, the cylinder 70 is immobile and cannot move the outrigger arm 145 and tiller head 16 either up or down. When the valve 160 is positioned in the straight flow through mode of position 162, hydraulic fluid under pressure is directed from main line 120 through branch line 165, line 166 and line 185 to the rod end of cylinder 70, thereby causing the rod 72 to apply a lifting force to the outrigger arm 14. When valve 150 is in a mode allowing the motor 30 to operate, the pressure applied to the rod end of cylinder 70 corresponds to that required to operate the motor 30, which is preferably just sufficient to keep the tiller head 16 floating along the surface of the ground with the teeth 33 penetrating the ground only to a desired depth. This feature allows the lift cylinder 70 to modulate the depth of the teeth 33 in the ground with the pressure required by motor 30 to rotate the rotor 32 and teeth 33. Therefore, if the tiller head 16 moves to gauge the teeth 33 deeply into the ground, an increased pressure will be required to drive the motor 30, causing a correspondingly increased fluid pressure to be directed to the rod end of cylinder 70. Such increased pressure causes the rod 72 to retract and left the tiller head 16 and additional increment out of the ground. When the tiller head 16 is lifted a sufficient amount to eliminate the excessive penetration of the teeth 33 in the ground, the pressure required to drive motor 30 will be decreased, resulting in a corresponding decrease in the fluid pressure in the rod end of cylinder 70, thereby decreasing the lifting force applied by rod 72 to the outrigger arm 14. Referring briefly to FIG. 2, the plurality of holes 67 in mounting bracket 67 and holes 69 in mounting bracket 68 for the lift cylinder 70 to allow the operator to select the angle of the cylinder 70 to the leveler arm 18 that is appropriate for applying the desired lifting force on the outrigger arm 14 for modulating the depth at which the operator desires the tiller teeth 33 to penetrate the ground.

Of course, if it is desired to lift the tiller head 16 completely out of the ground for transportation, the operator need only move the motor control valve 150 to the neutral position 151, which blocks the flow of hydraulic pressure through valve 150. This position will cause the pressure in the rod end of cylinder 70 to increase immediately to the full system pressure, which is more than sufficient to raise the outrigger arm 14 and tiller head 16 completely out of the ground. Conversely, when the operator starts the motor 30 again, the pressure in the rod end of cylinder 70 will be decreased to the extent required to operate the motor 30, and the outrigger arm 14 and tiller head 16 will lower gently to the ground.

If the soil condition is somewhat harder and requires a slight additional downward pressure on the outrigger arm 14 instead of an upward force component to get the teeth 33 to penetrate the ground, the lift cylinder control valve 160 can be moved to the float position 163. In this position, the slight back pressure that is inherent in the return lines of the hydraulic system is directed into both the blind end and the rod end of cylinder 70. However, since the diameter of the rod 72 decreases the effective area on which fluid pressure can be applied to the piston in the rod end of the cylinder to something less than the area on which the fluid pressure is applied in the blind end of the cylinder 70, there is a resulting net downward force applied to rod 72. This net downward force causes rod 72 to apply a downward force to the outrigger arm 14 and tiller head 16. The outrigger arm 14 and tiller head 16 are designed and balanced such that a significantly large force is not required to get the teeth 33 to penetrate even harder ground, so the back pressure in the return system is generally sufficient to provide the necessary downward force on rod 72 in this manner while allowing the tiller head 16 to "float" over varying ground contours. However, if additional pressure is required, a choke (not shown) can be positioned in the return line to increase the back pressure to the extent required to get the penetration desired.

The three position, four-way valve 170 controls the tilt cylinder 36 to tilt the tiller head 16 upwardly or downwardly as desired. The valve 170 has a blocked port neutral position 171, a straight flow through position 172, and a cross over position 173. When the valve 170 is in the blocked port mode position 171, the rod 38 of cylinder 36 remains motionless. When valve 170 is shaifted to the straight flow through mode of position 172, hydraulic fluid under pressure flows from main line 120 through branch line 175 and line 176 to the rod end of cylinder 36 to retract the cylinder and tilt the rotor head 16 upwardly. Conversely, when the valve 170 is shifted to the cross over mode of position 173, the hydraulic fluid pressure is directed from branch line 175 through line 177 to the blind end of cylinder 36, causing the rod 38 to extend and tilt the tiller head 16 downwardly. Return flow from the cylinder passes through the valve 170 and return line 178 to flow to tank 100.

The remaining controls of the tiller device of this invention are electrically actuated. These electrical controls can be divided basically into three groups. The first group includes the sensor apparatus 80 which operates to detect a plant or object in the proximity of the tiller head 16 and to actuate the solenoid valve 130 for retraction or extension of the cylinder 56. The second category is basically in the form of manual switching devices for manually accuating the solenoid valve 130 to extend and retract cylinder 56 and, if desired, to override the automatic sensing apparatus 80. The third group of electrical controls are basically internal control devices adapted to protect the machinery from potential damage due to inherent structural limitations of the equipment, improper operator control, unusual ground conditions, and the like.

The electric power for the system is preferably supplied by the 12 volt or 24 volt electrical system of the tractor T by connecting the system to the tractor's 12 volt or 24 volt DC battery 190. The description and schematic shown in FIG. 4 is premised on a negative ground electrical system, although it would operate equally as well with a positive ground system, with the exception that diodes 254, 255, which will be described in more detail later, would have to be reversed in orientation. The ground is designated by the numeral 200, and various components are grounded in physical proximity to their respective locations for convenience. The positive lead 202 extends from the battery to the right switch location of the joy stick switch apparatus 210. A fuse 192 is positioned in the electrical lead 202 to protect the system in the event of short circuit.

The joy stick control switch has a configuration that basically includes four double pole switches 214, 216, 218, and 220, all of which are operated by a single centrally positioned joy stick 212. Each of the switches 214, 216, 218, 220 has two alternative contact positions, with the outer most contacts on each switch being normally closed and the inner-most contacts being normally open, as shown in FIG. 4.

With all four switches in the normally outer contact closed position shown in FIG. 4, the live electric lead 202 from the battery 190 is connected to the closed terminal of right switch 214. The live electric circuit is then routed via lead 204 to the closed terminals of left switch 218, then via lead 206 to the closed terminals of top switch 220, and finally via lead 222 to the closed terminals of bottom switch 216. Therefore, when the joy stick 212 is centered with all of the switches 214, 216, 218, 220 in the normally closed positions shown, the electricity is routed from the closed contact of bottom switch 216 to lead 224 and through toggle switch 194 and lead 226 to the junction box 240. Therefore, with all of the switches closed as shown, electrical lead 226 is live at the junction box 240.

A lead 232 connected to live lead 226 in the junction box 240 extends to front switch 86 of the sensor apparatus 80. Front switch 86 is also a two pole switch with the outer contacts normally closed and the inner contacts normally opened. Lead 232 is connected to the outer normally closed contacts in front switch 86. Therefore, when the switch is in the normally closed position across the outer contacts as shown in FIG. 4, the electricity is routed through lead 234 back into the junction box 240 where it is connected with a lead 239 extending from the junction box 240 to the rear switch 88 of the sensor apparatus 80. Rear switch 88 is essentially comprised of a normally closed single position switch which routes the electricity through lead 238 and back into the junction box 240.

Lead 238 is connected in the junction box 240 with a lead 251 that extends to an outer limit switch 250. The outer limit switch sets the maximum extent to which cylinder 56 is allowed to extend the outrigger arm 14 and tiller head 16 away from the tractor T. The outer limit switch is normally closed across the main contacts, which allows electricity from lead 251 to be directed through lead 252 back into the junction box 240. Lead 252 is connected in the junction box 240 to the power lead 246 of coil 136 on solenoid valve 130. Coil 136 is grounded by lead 247.

In following the electrical connections described above, it can be seen that when the joy stick switch 210 is in the neutral position as shown in FIG. 4, when the feeler wand 84 has not contacted a plant P, and when the rod 58 of cylinder 56 is not fully extended, the coil 136 of solenoid valve 130 is actuated to shift the valve 130 to the straight flow through position 132. In this position 132, hydraulic fluid is directed to cylinder 56 to cause the rod 58 to extend. When the rod 58 has extended to the pre-determined outer limit position, outer limit switch 250 is actuated to open the normally closed connection between leads 251 and 252. When switch 250 opens these contacts, the circuit that energizes coil 136 is opened. Therefore, as soon as rod 58 reaches the outer limit of extension as set by the position of switch 250, coil 136 is de-energized and spring 137 shifts valve 130 back to the neutral blocked port position 131, thereby deactivating cylinder 56 to terminate the extension motion.

Therefore, the outer limit switch 250 keeps the components of the equipment from hitting the physical limits of movement in relation to each other which could cause undue wear and tear on the apparatus. It can also be set or adjusted for short extension strokes or longer extension strokes as the operator desires. For example, if the tractor and tiller are used in the aisle between rows that are closely spaced together, it might be necessary to adjust the limit switch 250 to allow only short extensions close to the tractor.

The electric circuit also energizes coil 116 of solenoid valve 112 at the same instant it energizes coil 136. Power lead 242 from coil 116 is connected in the junction box 240 through diode 255 to the leads 230, 251 and 252. Therefore, whenever coil 136 is energized to extend cylinder 56, coil 116 is energized to shift solenoid valve 112 to the blocked port mode of position 114 to prohibit the hydraulic fluid from bypassing the priority valve 122 through bypass line 110 into main line 120. As soon as the coil 116 is de-energized, the spring 115 shifts the valve 112 back to the straight flow through mode of position 113 to gain bypass fluid through line 110 to main line 120.

As the tiller moves forward to a point where the feeler wand 84 of sensing apparatus 80 contacts a plant P, the wand 84 pivots about pin 90 to move the switch activator bar 85 against the linkages 87, 89 of switches 86, 88, respectively. These linkages 87, 89 are adjusted such that switch 88 is opened before switch 86 is actuated. Therefore, the first thing that happens upon the feeler wand 84 contacting a plant P, is that the switch 88 is opened and the live connection from lead 239 to 238 is opened so that coil 136 cannot be actuated to shift to valve 130 to the straight flow through position 132 required to extend cylinder 56 by automatic control, even if the rod 58 is retracted away from the outer limit switch 250.

A slight further movement of the wand 84 causes the switch actuator bar 85 to also open the outer contacts and close the inner contacts of switch 86. This change in position in switch 86 has the effect of diverting the electric current from live lead 232 through the inner contacts of switch 86 to the lead 235. Lead 235 is connected in the junction box 240 to power lead 244 of coil 134 on solenoid valve 130. Coil 134 is grounded via lead 245 to complete the electric circuit. Therefore, sufficient movement of wand 84 induced by contact with plant P diverts live electrical power to actuate coil 134 of solenoid valve 130 to shift valve 130 to the cross over position 133. In this cross over position 133, hydraulic fluid under pressure from line 124 is directed to the rod end of cylinder 56 to retract the rod 58, thereby retracting the outrigger arm and tiller head 16 out of the row of plants P. At the same time, power lead 242 from coil 116 of solenoid valve 112 is connected via diode 254 to the now live lead 235. Therefore, energizing coil 134 of solenoid valve 130 in this manner also results in simultaneous energization of coil 116 of solenoid valve 112 to again block the bypass 110 as hydraulic fluid is diverted to cylinder 56. The diode 255 prevents the electric current from flowing backward into lines 238, 251, or 230. Likewise, when power lead 242 was energized by lead 238, diode 254 prevented backward flow of electric current to energize leads 235, 244, or 228. If this device was connected to a positive ground electrical system, the direction of these two diodes 254, 255 would have to be reversed.

It can be appreciated therefore that any time coil 134 or coil 136 of solenoid valve 130 is actuated to direct a flow of hydraulic fluid to the extension and retraction cylinder 56, the solenoid valve 112 is actuated to block the bypass of fluid through line 110 to line 120.

If the forward progress of the machine was stopped with the wand in contact with plant P, the cylinder 56 would retract the outrigger arm a sufficient distance to again deactivate switch 86 to open the inside contacts and close the outside contacts for the extension mode. As soon as the inside contacts in switch 86 are opened, coil 134 is de-energized and the retraction is discontinued. However, closing the outside contacts in switch 86 cannot alone start the extension mode because switch 88 would still be held open by the wand 84 being in contact with the plant P. Therefore, the machine is capable of just setting deactivated with the wand 84 in contact with the plant P. However, as soon as the machine is moved forward a sufficient distance for the wand 84 to clear the plant P, the contacts in switch 88 would again be closed along with the closed outside contacts in switch 86 to energize coil 136 and start the extension mode of cylinder 56 to extend the outrigger arm 14 and tiller head 16 back into the row.

The above description covers the automatic extension and retraction functions in response to the sensor apparatus 80 "detecting" a plant P in proximity of the tiller head 16. However, as mentioned above, the circuit is designed so that the operator can override the automatic sensor features and operate the tiller manually if he so desires. He can also simply turn off the automatic sensor features so that they don't operate at all, while he continues to operate the apparatus manually with the joy stick 212.

If the operator desires to operate the apparatus manually for some reason, such as when tilling between very small trees or other young plants that might not have sufficient height or resistance to actuate the sensor apparatus 80, he can simply switch the toggle switch 194 to "off" or remove sensing wand 84. The "off" position of toggle switch 194 opens the power circuit to the automatic sensor switches 86, 88 by opening the connection between leads 224 and 226. In this manual mode, the operator can still retract the tiller by manipulating joy stick 212 to switch the normally closed contacts of switch 216 to the normally open contacts thereof, thereby diverting electric current from lead 224 to lead 228. Lead 228 is connected in the junction box 240 to power leads 244 of coil 134 and 242 of coil 116 to effect the retraction mode of cylinder 56 as described above. Conversely, if the operator desires to manually extend the outrigger arm 14 and tiller head 16 into the row, he can manipulate joy stick 212 to open the normally closed contacts of switch 220 and close the normally open contacts of that switch to divert electric current from lead 222 to lead 230. Lead 230 is connected in the junction box 240 to leads 252 and 246, which is effective to extend the cylinder 56. Since lead 230 from the joy stick switch 210 is connected directly to leads 242 and 246, it can also be used to override the outer limit switch 250 in the automatic mode.

It should be noted that this manual extend mode is functional to extend the outrigger arm 14 even though the wand 84 might be in contact with an object. Therefore, in order to prevent damage to the sensor apparatus 80, including the wand 84, the pressure relief valve 108 in the hydraulic circuit is set high enough to push over large weeds and other plants that the tiller is capable of handling, but low enough to prevent damage to the wand 84 or other parts of the sensor apparatus 80 if the plant P or other object against which the wand is positioned is too large or stiff for the apparatus to handle.

It should also be noted that even when the toggle switch 194 is switched to the closed position for automatic control functioning, manipulation of the joy stick 212 to retract or extend the cylinder 56 manually has the effect of overriding the automatic controls so that the manual control dominates. This effect is accomplished by the normally closed contacts of switches 216, 220 being opened to de-energize lead 226 to the junction box 240 as those switches are being shifted to close the normally open contacts therein for the manual extension or retraction modes. In addition, the operator has the option to simply freeze the cylinder 56 in any position, even during an automatic extension or retraction, by simply moving the joy stick 212 either left or right to open the normally closed contacts of either switch 214 or 218. (It should be noted that the designations "left", "right", "up", "down", "forward" or "backward" used herein in relation to the joy stick control is related to the orientation and wiring shown in FIG. 4; however, the switch can be oriented or wired for any desired directions of movement in relation to the functions actuated thereby). Opening either of these normally closed contacts in switch 214 or 218 results in de-energizing the automatic functions of the apparatus so that the springs 135, 137 of the solenoid valve 130 simply return the valve 130 to the blocked port mode of neutral position 131, which prevents any further movement in any direction of the rod 58 of cylinder 56. This feature can be used, for example, if the operator sees a large weed approaching the wand 84 which he anticipates would be able to activate the automatic retraction function of the apparatus. He can simply move the joy stick 212 either left or right to freeze the tiller in whatever position it is at the time he moves the joy stick 212 so that it will continue in the same position to cultivate out the large weed. Conversely, if the operator anticipates that a plant will be too small to prevent extension of the tiller into the plant after it has been retracted, he can simply manipulate the joy stick 212 either left or right to freeze the position of the tiller before it extends into the small plant.

Although the joy stick switch control described above is convenient and very effective to use for manual operation over override of the automatic extension and retraction functions of this invention, individual separate switches, such as toggle switches or push button switches can also be used to accomplish the same functions. Also, it is contemplated that valves 150, 160, 170 can also be solenoid actuated valves controlled by electric switches rather than the manual levers shown in FIG. 1. For example the multiple function joy stick switch could be a type with eight switch poles so it could be used to control all the functions of the tiller apparatus. It is also contemplated that the solenoid valve functions could be accomplished by pilot operated hydraulic valves, although hydraulic circuits and controls for such pilot operated valves are not shown or described in this disclosure.

As mentioned above, the solenoid valve 180 in pressure line 166 of lift cylinder 70 is an optional feature that can be used to prevent any movement of the lift cylinder 70 unless the extension and retraction cylinder 56 is fully extended. This feature is particularly useful in vineyard applications wherein the vines are often planted on berms that are significantly higher than the ground in the aisles between the rows or where the tractor travels. If the machine was not equipped with this solenoid valve 180, retraction of the tiller head 16 out of the row would also cause it to drop off the berm, in which case the lift cylinder 70 would extend to lower the tiller to the ground level. Then, as the wand 84 clears the plant P and the extension mode is actuated, the cylinder 56 could jam the tiller head into the sharply rising berm too fast or too hard for the lift cylinder 70 to respond to lift the tiller head 16 up to the top of the berm again. However, if the apparatus is equipped with the solenoid valve 180 in pressure line 166 as shown in FIG. 4, as the cylinder 56 retracts the tiller head out of the row, the solenoid valve 180 would be positioned in the blocked port mode 181, thereby prohibiting lift cylinder 70 from extending or allowing the tiller head 16 to drop to the surface of the ground adjacent the berm. In other words, the elevation of the outrigger arm 14 and tiller head 16 would be maintained at a constant height relative to the tractor T as they are retracted and extended out of and into the row. As soon as the outrigger arm 14 and tiller head 16 are fully extended back into the row, the solenoid valve 180 would shift again to the straight flow through mode of position 182 to allow fluid to flow through lines 166 and 188 into and out of the lift cylinder 70 in the normal manner.

This feature is controlled electrically by the normally open contacts of outer limit switch 250. An electric lead 260 is tapped into the main lead 202 from the battery 190. The lead 260 is connected in the junction box 240 to power lead 261 of coil 183 of solenoid valve 180. The ground lead 262 of coil 183 is connected in the junction box 240 to a lead 263 that extends to the normally open inside contacts of outer limit switch 250. Another lead 264 extends from the opposite normally open contact to electrical ground 200. Therefore, when the rod 58 of cylinder 56 is fully extended to actuate outer limit switch 250, the normally open inside contacts therein are closed to complete the electric circuit for energizing coil 183 to shift the valve 180 to the straight flow through position 182. However, when the rod 58 of cylinder 56 begins to retract, the switch 250 returns to the normally closed position of the outside contacts and opens the electric circuit of coil 183, thereby de-energizing the coil 183 and allowing the spring 184 to reposition valve 180 to the blocked port position 181. In this manner, whenever the rod 58 of cylinder 56 is not fully extended, lift cylinder 70 is locked in position. On the other hand, when rod 58 of cylinder 56 is fully extended, lift cylinder 70 can operate and modulate in the normal manner described above.

An alternative depth control feature is shown in FIG. 5. This feature can be a substituted for or used in addition to the feature described above including the solenoid valve 180 and inside contacts of the upper limits switch 250 which allow the lift cylinder 70 to operate only when the extension and retraction cylinder 56 is fully extended. In the schematic diagram shown in FIG. 5, the lift cylinder 70 and rod 72 operate to provide a lifting or lowering force on the outrigger arm 14 and tiller head 16, as described in the preferred embodiment. In this alternative embodiment however a three position, four-way solenoid valve 280 is provided to control the lift cylinder 70 in such a manner that it responds to or follows the terrain of the ground. The ground following function is provided by a gauge wheel 272 connected by linkage 274 to a float switch 270. The switch 270 has two pairs of contacts, both of which are normally open as shown in FIG. 5. When the terrain rises in relation to the tiller head 16, or if the tractor rolls, the linkage 274 will close the inside contacts allowing electric current to flow from the battery 190 through lead 276 and lead 278 to energize coil 286 of solenoid valve 280. Coil 286 is then operable to shift the valve 280 to the straight flow through mode of position 282 to direct hydraulic fluid under pressure into the rod end of cylinder 70 to raise the outrigger arm 14. As soon as the outrigger arm 14 is raised sufficiently to open the inside contacts of switch 270, coil 286 is de-energized and spring 287 shaift the valve 280 back to the blocked port mode of position 281 to hold the lift cylinder 70 motionless. On the other hand, if the terrain of the ground falls in relation to the tiller head 16, the gauge wheel 272 and linkage 274 will follow the ground terrain downwardly in relation to the switch 270 and cause the outside contacts in switch 270 to close thereby directing electric current through lead 277 to coil 284. The energized coil 284 shifts the valve 280 to the cross over mode of position 283 to direct hydraulic fluid under pressure into the blind end of lift cylinder 70 to lower the outrigger arm 14. As soon as the outrigger arm 14 is lowered a sufficient distance, the switch 270 will open again and de-energize coil 284 so that spring 285 can shift the valve 280 back to the blocked port mode of position 281. In this manner, the gauge wheel 272 can be adjusted to allow a pre-determined penetration depth of the tiller head 16, and from that point the hydraulic controls shown in FIG. 5 will maintain that depth regardless of the ground terrain or movement of the tractor T in relation to the terrain at the tiller head.

It should be understood that even though this invention is described in terms of a rotary tiller for ease and clarity of the narrative, it is equally adaptable and useful for other work tools or devices, such as mowers, saws, and the like, where similar mounting structures and controls are required or desired. For example, a rotary mower blade could be mounted on the end of the outrigger arm instead of the rotary tiller, and the structure and the sensing and control advantages of this invention would be equally useful for mowing between and around objects, such as trees, fence posts, and the like. Therefore, the invention wish it to be understood that the use of the term "tiller" in describing and claiming this invention is not intended to limit the application and coverage to tillers to the exclusion of such other working tools as mowers, saws, sprayers, material spreaders, and the like that can be mounted on and used with the structure and control system of this invention.

While the present invention has been described with some degree of particularity, it should be appreciated that the present invention is defined by the following claims construed in light of the prior art so that modifications or changes may be made to the preferred embodiment of the present invention without departing from the inventive concepts contained herein.

What we claim is:

1. Retracted working tool apparatus mounted on a main frame adapted for mounting on a movaable vehicle and for working the area around and between objects in a row as the vehicle moves parallel to the row comprising:

a rigid outrigger arm positioned in spaced-apart relation to said main frame;

a pivotal control arm,, one end of which is pivotally connected to said main frame such that said control arm pivots about a first pivot axis in relation to said main frame, and the other end of which is pivotally connected to said outrigger arm such that said control arm and said outrigger arm are pivotal in relation to each other about a second pivot axis in parallel spaced-apart relation to said first pivot axis;

leveler means connected to said outrigger arm for controlling and maintaining the attitude of said outrigger arm in relation to the ground, said leveler means being comprised of an elongated leveler arm pivotally attached at one end to the main frame and extending outwardly a spaced distance above said outrigger arm, and a suspension link extending generally downwardly from the distal end of said leveler arm and attached to said outrigger arm a spaced distance outwardly from said second pivot axis;

work tool means mounted on said outrigger arm and adapted for working the area adjacent the distal end of said outrigger arm;

first drive means connected to said control arm for pivoting said control arm about said first pivot axis in relation to said main frame;

second drive means connected to said leveler arm for pivoting said outrigger arm about said second pivot axis in relation to said control arm;

retraction control means associated with said outrigger arm and with said first drive means for activating said first drive means when said work tool means approaches an object, thereby to retract said outrigger arm in relation to said main frame a sufficient distance for said work tool means to clear said object.

2. The retractable working tool apparatus of claim 1, wherein said first drive means includes first reversible hydraulic motion producing means and said retraction control means includes a first three position four-way solenoid valve, one position of which is adapted to direct flow of hydraulic fluid to drive said first hydraulic motion producing means in one direction, a second position of which is adapted to direct flow of hydraulic fluid to drive said first hydraulic motion producing means in the opposite direction, and a third position of which is adapted to block flow of hydraulic fluid in either direction.

3. The retractable working tool apparatus of claim 2, including first switch means for directing electric power to said first solenoid valve in a first mode to actuate said first solenoid valve to said one position and alternately for directing electric power to said first solenoid valve in a second mode to actuate said first solenoid valve to said second position, and second switch means for breaking the circuit directing electric power to said first solenoid valve in said first mode.

4. The retractible working tool apparatus of claim 3, including switch actuator means adapted to detect an object in the proximity of said work tool means and to actuate said first and second switch means in response to detection of the object in a pre-determined spacial proximity to the work tool means, said switch actuator means being connected to said first and second switch means in such a manner that it actuates said first switch means to said first mode and said second switch means to complete said first mode circuit when no object is detected, to actuate said second switch means to break said first mode circuit upon initial detection of an object, and to actuate said first switch means to said second mode after the work tool means moves an incremental distance closer to the object than it is upon initial detection.

5. The retractable working tool apparatus of claim 4, wherein said switch actuator means includes a feeler wand on said working tool apparatus that moves in relation to said first and second switch means in response to contact with an object, said wand being connected in such a manner that the initial increment of movement actuates said second switch means and an additional increment of movement is required to actuate said first switch means from said first mode to said second mode, and corresponding incremental movements in the opposite direction reactuates said first and second switch means in reverse order to the initial modes.

6. The retractable working tool apparatus of claim 1, wherein said suspension link is adjustably attached to said outrigger arm in such a manner that the distance between said suspension link attachment and said second pivot axis can be varied.

7. The retractable working tool apparatus of claim 1, including second drive block means for holding said second drive means to prohibit said outrigger arm from pivoting downwardly about said second pivot axis when said outrigger arm is not fully extended a predetermined distance from said vehicle.

8. The retractable working tool apparatus of claim 7, including block valve means adapted to alternately allow and block the flow of hydraulic fluid to said second motion producing means in a direction to cause downward pivotal movement about said second pivot axis, and switch means connected to said outrigger arm for causing said block valve means to shift to the position to allow flow when said outrigger arm is fully extended the predetermined amount and causing said block valve means to shift to the position to block flow when said outrigger arm is not fully extended.

9. The retractable working tool apparatus of claim 1, including automatic depth control means connected to said second drive means for maintaining said work tool means in a constant spacial relation to the ground, said automatic depth control means including gauge means attached to the distal end of said outrigger arm for monitoring the distance between the outrigger arm and the surface of the ground, and switch means connected to said gauge means for actuating said second drive means to pivot said outrigger arm upwardly when the distance between the outrigger arm and the ground decreases to less than a preselected amount and for actuating said second drive means to pivot said outrigger arm downwardly when the distance between the outrigger arm and the ground increases to more than a preselected amount.

10. The retractable working tool apparatus of claim 9, wherein said second drive means includes second reversible hydraulic motion producing means and said automatic depth control means includes valve means adapted to direct flow of hydraulic fluid to drive said second hydraulic motion producing means in one direction in a first position, to direct flow of hydraulic fluid to drive said second hydraulic motion producing means in the opposite direction in a second position, and to not direct flow of hydraulic fluid to drive said second motion producing means in any driection in a third position, said switch means being connected to said valve means to actuate said valve means to the appropriate position to raise, lower, and maintain the outrigger arm in response to said gauge means.

11. The retractable working tool apparatus of claim 10, wherein said valve means includes a three position, four way solenoid valve, and said switch means includes a two position, open pole switch, one position of said switch being operable to connect an electric current to said solenoid valve to actuate it to said first position, the other position of said switch being operable to actuate it to said second position, and an open electric circuit in said switch being operable to leave said solenoid valve in said third position.

12. In tool apparatus having a tool, a main frame and reversible hydraulic powered motion producing means for moving the tool in one direction with respect of said main frame and in the opposite direction in response to the proximity of an object to the tool, wherein the improvement comprises:

solenoid valve means having a first position adapted to direct a flow of hydraulic fluid to drive said motion producing means in one direction, a second position adapted to direct a flow of hydraulic fluid to drive said motion producing means in the opposite direction, and a third position for not directing hydraulic fluid to drive said motion producing means in any direction;

sensing means for sensing the proximity of the object to the tool;

automatic switch means connected to said sensing means for directing an electric current to said solenoid valve means to move said tool in said one direction to a given distance away from said main frame whenever said tool is not within a preselected spacial proximity to an object, to move said tool in said opposite direction to a position less than said given distance from said main frame whenever said tool is within said pre-selected proximity to the object and approaching closer to said object, and to prevent movement in either direction whenever said tool is within said pre-selected proximity to the object and not approaching closer to the object even when said tool is less then said given distance from said main frame.

13. The improvement of claim 12, wherein said sensing means includes an elongated wand adapted to contact the object as the tool approaches the object within said preselected spacial proximity and to move in relation to the tool as the tool continues to approach the object with the wand in contact therewith, and said automatic switch means includes a first switch and a second switch, said first switch having a first position and a second position, the first position being adapted to direct an electric current in a first circuit to said solenoid valve means to move said tool in said one direction and the second position being adapted to direct an electric current in a second circuit to said solenoid valve means to move said tool in said opposite direction, and said second switch being positioned in and adapted to open and close said first circuit, said first and second switches being connected to said wand in such a manner that an initial increment of movement of said wand in response to contact with said object causes said second switch to open said first electric circuit so that said solenoid valve means is in said third position, an additional increment of movement of said wand in response to contact with the object causes said first switch to move from the first position to the second position to shift the solenoid valve means to said second position to drive said motion producing means in said opposite direction, movement of said wand back said additional increment in response to said tool moving away from said object causes said first switch to move from the second to the first position to shift the solenoid valve means to said third position to hold said motion producing means motionless, and movement of said wand back said initial increment causes said second switch to close said first circuit to shift the solenoid valve means to drive said motion producing means in said one direction.

14. The improvement of claim 13, including manual switch means for overriding automatic control of said motion producing means by said automatic switch means and for operating said motion producing means manually, said manual switch means including a first manually operated switch for de-energizing the electric circuit to said automatic switch means to shift said solenoid valve means to said third position to hold said motion producing means motionless, a second manually operated switch for deenergizing the electric circuit to said automatic switch means and for directing an electric current to said first electric circuit downstream from said automatic switch means to shift said solenoid valve means to said first position to move said tool in said one direction, and a third manually operated switch for deenergizing the electric circuit to said automatic switch means and for directing an electric current to said second electric circuit downstream from said automatic switch means to shift said solenoid valve means to said second position to move said tool in said opposite direction.

15. The improvement of claim 14, wherein said first, second, and third switches of said manual switch means are parts of a combined joy stick switch group operated by a single joy stick.

16. The improvement of claim 14, including a manual/automatic mode switch downstream of the manual switch means and upstream of the automatic switch means for deenergizing the automatic switch means while leaving the manual switch means energized.

17. The improvement of claim 14, including outer limit stop means for limiting the extent to which said motion producing means moves said tool in said one direction, said outer limit stop means including a switch in said first electric circuit and adapted to open said first electric circuit to prevent said solenoid valve means from being shifted to said first position when said tool is moved to a predetermined maximum extent in said one direction.

18. The improvement of claim 13, including a hydraulic circuit for directing a flow of hydraulic fluid under pressure from a hydraulic fluid pressure source to said reversible hydraulic powered motion producing means and to other hydraulic operated components of the tool apparatus, said hydraulic circuit including proportional flow divider means for directing a preselected proportion of the total flow of hydraulic fluid to said reversible hydraulic powered motion producing means and the remainder to the other components regardless of pressure differentials between said reversible hydraulic powered motion producing means and the other components.

19. The improvement of claim 18, including pressure relief bypass means for allowing hydraulic fluid to bypass said proportional flow divider means when said solenoid valve means is shifted to said third position wherein flow therethrough is blocked, said pressure relief bypass means having a pilot operated pressure relief valve which bypasses hydraulic fluid when the pressure in the circuit reaches a predetermined threshold.

20. The improvement of claim 19, including a positive controlled bypass circuit for bypassing fluid flow around said proportional flow divider means and around said pressure relief bypass means to the other components when said solenoid valve means is shifted to said third position to block flow therethrough, said positive controlled bypass circuit including a flow line connected to said hydraulic circuit upstream of said pressure relief bypass means and upstream of said proportional flow divider and connected to the circuit directed to the other components downstream of said pressure relief bypass means and said proportional flow divider means, and a diverter valve positioned in said positive controlled bypass circuit adapted for alternately blocking and allowing fluid flow therethrough, said diverter valve being actuated to shift to the position blocking flow whenever said solenoid valve means is shifted to a position allowing flow therethrough and said diverter valve being shifted to the position allowing flow therethrough whenever said solenoid valve means is in said third position blocking flow therethrough.

21. The improvement of claim 20, wherein said diverter valve is solenoid actuated to said blocked position and spring biased to said flow position and the solenoid circuit of which is connected to said first and second electric circuits so that an electric current actuates the solenoid of said diverter valve to shift the position of the diverter valve to allow fluid flow therethrough whenever electric current flows in the first electric circuit and whenever electric current flows in the second electric circuit.

22. The improvement of claim 21, including a first diode positioned in the electric circuit that is connected to the solenoid of said diverter valve between said first electric circuit and the connection to said second electric circuit to prevent backflow of electric current from said second electric circuit to said first electric circuit, and a second diode positioned in the electric circuit that is connected to the solenoid of the diverter valve between said second electric circuit and the connection to said first electric circuit to prevent backflow of electric current from said first electric circuit to said second electric circuit.

23. The improvement of claim 18, whenever return fluid flow from said reversible hydraulic powered motion producing means is joined with the remainder flow from said proportional flow divider means and downstream therefrom and directed to the other components.

* * * * *

UNITED STATES PATENT AND TRADEMARK OFFICE
CERTIFICATE OF CORRECTION

PATENT NO. : 4,518,043
DATED : May 21, 1985
INVENTOR(S) : Jack F. Anderson and Clayton Melrose It is certified that error appears in the above-identified patent and that said Letters Patent is hereby corrected as shown below:

In column 2, line 23, delete "2,719,081" and substitute --2,791,081--.
In column 2, line 32, delete "of" and substitute --or--.

In the Detailed Description of the Preferred Embodiment

In column 9, line 31, delete "four-away" and substitute --four-way--.
In column 10, line 15, delete "129" and substitute --120--.
In column 11, line 59, delete "shaifted" and substitute --shifted--.
In column 13, line 56, delete "gain" and substitute --again--.
In column 17, line 20, delete "substituted" and substitute --substitute--.
In column 17, line 47, delete "shaift" and substitute --shifts--.
In column 18, line 12, delete "invention" and substitute --inventors--.

In the Claims

In claim 1, line 27, delete "Retracted" and substitute --Retractable--.
In claim 1, line 28, delete "movaable" and substitute --movable--.
In claim 1, line 34, delete "," (first occurrence).
In claim 4, line 22, delete "retractible" and substitute --retractable--.
In claim 23, line 5, delete "whenever" and substitute --wherein--.

Signed and Sealed this

Tenth Day of September 1985

[SEAL]

Attest:

DONALD J. QUIGG

Attesting Officer     Acting Commissioner of Patents and Trademarks - Designate